Patented Oct. 10, 1922.

1,431,801

UNITED STATES PATENT OFFICE.

ALBERT C. HOLZAPFEL, OF NEW YORK, N. Y.

SURFACE-COATING COMPOSITION.

No Drawing. Original application filed June 15, 1922, Serial No. 568,633. Divided and this application filed August 5, 1922. Serial No. 579,932.

*To all whom it may concern:*

Be it known that I, ALBERT C. HOLZAPFEL, a citizen of the United States, residing at New York, in the county of New York and State of New York, have invented certain new and useful Improvements in Surface-Coating Compositions, of which the following is a specification.

This invention relates to surface coating compositions, and more particularly to a mixture of cumarone resin and rubber in the form of a gum, and to the manufacture of a varnish and paint medium from such mixture.

The present application is a division of my co-pending application Serial No. 568,633, filed June 15, 1922. In the said application, I have disclosed a paint consisting of a mixture of cumarone resin, varnish, and rubber, which composition forms the subject matter of the present application. The cumarone resin may be melted and from 1 to 10 per cent. by weight of rubber added thereto. This mixture is then mixed with a suitable solvent, the solvent being employed in the proportion of from 50 to 65 per cent. by weight of the entire mixture. Instead of forming the mixture of cumarone resin and rubber before adding the solvent, the cumarone resin may be dissolved hot or cold in a suitable solvent and rubber, in solution, may be added thereto in suitable porportions, or the cumarone resin may be first melted with linseed oil, China wood oil, or other paint oil and rubber, in solid form, or in solution, may be added to this mixture. In any of the above forms, the addition of rubber and cumarone resin produces an improved varnish or paint medium having increased elasticity and flowing capacity.

An object of the invention is the provision of a surface coating composition of increased elasticity and free flowing qualities, whereby an extremely smooth surface may be obtained.

The proportions in which the various materials are mixed may be carried within wide limits. As stated, a mixture of cumarone resin and rubber may first be formed before the addition of a solvent or the cumarone resin may be dissolved in the solvent and the rubber then added thereto. Any suitable solvent, such as petroleum spirit, tar oil, or other suitable hydrocarbon solvent may be added.

In a typical embodiment of the invention, from 35 to 40 parts by weight of cumarone resin is dissolved in from 60 to 90 parts by weight of petroleum spirit tar oil, or other suitable hydrocarbon solvent, and sufficient rubber is added to constitute from ½ to 3 per cent. of the entire content of the paint. The rubber may be dissolved in a suitable solvent and added, or may be melted into the mixture. The rubber is preferably added to the varnish during the process of manufacture, but it may be added subsequently in the state of solution. As stated, a quantity of cumarone resin and rubber may first be melted and the solvent then added. While the proportion of rubber may vary within wide limits, I have found that the addition of ½ to 3 per cent. of rubber by weight of the total content of the paint is preferable.

While I have described in detail the preferred practice of my process, it is to be understood that the details of procedure, and proportion of ingredients may be widely varied, and that known chemical ingredients may be employed in place of the materials mentioned, without departing from the spirit of the invention or the scope of the subjoined claims.

Having thus described my invention, I claim:

1. A resin or gum suitable for use in a surface coating composition comprising cumarone resin and less than ten per cent. of rubber.

2. A surface coating composition comprising cumarone resin, a solvent therefor, and from ½ to 3 per cent. of rubber.

3. A surface coating composition comprising cumarone resin, petroleum spirit, and a small quantity of rubber.

4. A surface coating composition comprising cumarone resin, petroleum spirit, and from ½ to 3 per cent. of rubber.

In testimony whereof, I affix my signature in presence of two witnesses.

ALBERT C. HOLZAPFEL.

Witnesses:
 WM. MARTIN,
 J. A. SMITH.